US005134008A

United States Patent [19]

Alm

[11] Patent Number: 5,134,008

[45] Date of Patent: Jul. 28, 1992

[54] COVERS FOR HANDLES AND THE LIKE

[75] Inventor: Kjell Alm, Gothenberg, Sweden

[73] Assignee: Scanalma AB, Gothenberg, Sweden

[21] Appl. No.: 728,779

[22] Filed: Jul. 8, 1991

Related U.S. Application Data

[63] Continuation of Ser. No. 398,476, Aug. 25, 1989, abandoned.

[51] Int. Cl.5 .......................... B05D 1/14; B32B 1/00; B62K 21/26; A63B 53/10

[52] U.S. Cl. ........................................ 428/90; 428/88; 428/167; 428/172; 428/542.8; 74/551.9; 74/543; 273/81 B; 273/81 R; 273/73 J; 81/489

[58] Field of Search ................. 428/90, 156, 167, 409, 428/95, 88, 172, 542.8; 74/551.9, 543; 273/81 R, 81 B, 73 J, 67 DA, 67 DB; 16/DIG. 12; 81/489

[56] References Cited

U.S. PATENT DOCUMENTS 2,002,535 5/1935 Gagnier ............................ 273/81 R
3,518,154 6/1970 Broadhurst ............................ 428/90
3,591,401 7/1971 Synder et al. .......................... 428/90
3,852,146 12/1974 Squier et al. .......................... 428/90
4,012,039 3/1977 Yerke ................................ 273/72 R
4,102,456 7/1978 Morris .................................. 428/90
4,133,529 1/1979 Gambino .......................... 273/81 R
4,362,773 12/1982 Shikinami ............................ 428/90
4,415,618 11/1983 McClung ............................. 428/90
4,588,629 5/1986 Taylor .................................. 428/90
4,899,411 2/1990 Johnson et al. ....................... 428/90
4,927,682 5/1990 Nagura et al. ....................... 428/90

FOREIGN PATENT DOCUMENTS 0070268 1/1983 European Pat. Off. .
1056407 1/1967 United Kingdom .................. 428/90

*Primary Examiner*—Ellis P. Robinson
*Assistant Examiner*—Donald J. Loney
*Attorney, Agent, or Firm*—Burns, Doane, Swecker & Mathis

[57] ABSTRACT

A cover for handles and the like comprising a material which has the ability to shrink when heated. The cover further comprises grooved defined on the outer surface of the cover. Moreover the cover is covered with fibers through electrostatic deposition. The cover of the present invention can be employed on handles associated with tools, sports articles, and the like.

10 Claims, 1 Drawing Sheet

COVERS FOR HANDLES AND THE LIKE

This application is a continuation of application Ser. No. 07/398,476, filed Aug. 25, 1989 is now abandoned.

BACKGROUND OF THE INVENTION

The present invention relates to a cover for use on handles and the like as well as handles which are provided with such covers. The present invention can preferably be employed with handles for tools, sports articles and similar objects.

Presently, there exists a virtually unlimited number of types of shafts and handles which are employed with tools, sports articles, steering wheels and so on. These handles are usually made from wood, steel, bones, or other hard material and are often provided with a cover made from a relatively soft material, such as rubber, cloth or similar material in order to improve the feel when the handle is grasped. It is also known that handles may be made from a somewhat softer material in their entirety. These "softer" handles are particularly susceptible to problems associated with vibrations during use which are injurious to the user as well as complicate the work one intends to perform.

Handles made from a hard material, such as wood, can also easily injure the skin during use. These injuries are associated both with the mechanical impact between the skin and the hard surface and the fact that hand perspiration is not allowed to evaporate so the hand becomes moist. The same problem occurs even if the surface is soft, e.g., made of rubber, but does not allow the perspiration to evaporate.

Accordingly, the need still exists for a handle, shaft, or the like with the proper stability and at the same time has a surface that allows perspiration to evaporate while damping the vibrations. Further, it is desirable to maintain the handle at a pleasant temperature because an extremely cold handle can cause the fingers to become white and stiff whereas handles that are just too warm are often very difficult to hold.

SUMMARY OF THE INVENTION

The problems associated with the known and conventional handles described above have been solved by the present invention.

In particular, the present invention relates to a cover for handles and similar objects which comprises a material that has the ability to shrink when heated. Moreover, the cover has ridges defined on an outer surface thereof and has been covered with fibers through electrostatic deposition, also called flocking.

DETAILED DESCRIPTION OF THE PREFERRED EMBODIMENT

The cover according to the present invention may be evenly covered with flocked fiber over the entire surface or it may be only flocked on the sides and tops of the ridges because the flocks at the bottom of the grooves between the ridges are not as useful as those on the sides and the tops.

The material that is preferably employed in the present invention comprises a plastic which has the ability to shrink when heated, so called heat-contractible plastics. Such plastics are well known and will not be described in detail here.

They preferably comprise thermoplastics and one type which is especially preferred in the present invention is PVC-plastics. These materials are provided with the ability to shrink when heated during their manufacture. For example, after the plastic has been extruded or molded, they can be stretched while hot and then allowed to cool awhile still being stretched. This process allows tensions to be built into the material which tensions are released when the material is heated so as to make the material contract. The shrinking ability of the material, when, for example, the material is in the shape in the tube is diametrically 40–50% and longitudinally 5–15%. Thus, a tube of heat-contractible plastics is able to firmly grip a shaft or handle.

In another aspect, the present invention relates to tools, sports articles, and the like which have been provided with the covers described above.

In each of these environments, the cover on the handle has taken on the shape of the handle through heating of the cover after it has been mounted on the handle.

The invention will be described below in connection with the accompanying drawings in which the invention is exemplified by means of a tube of a heat-contracting plastics.

Figure 1:
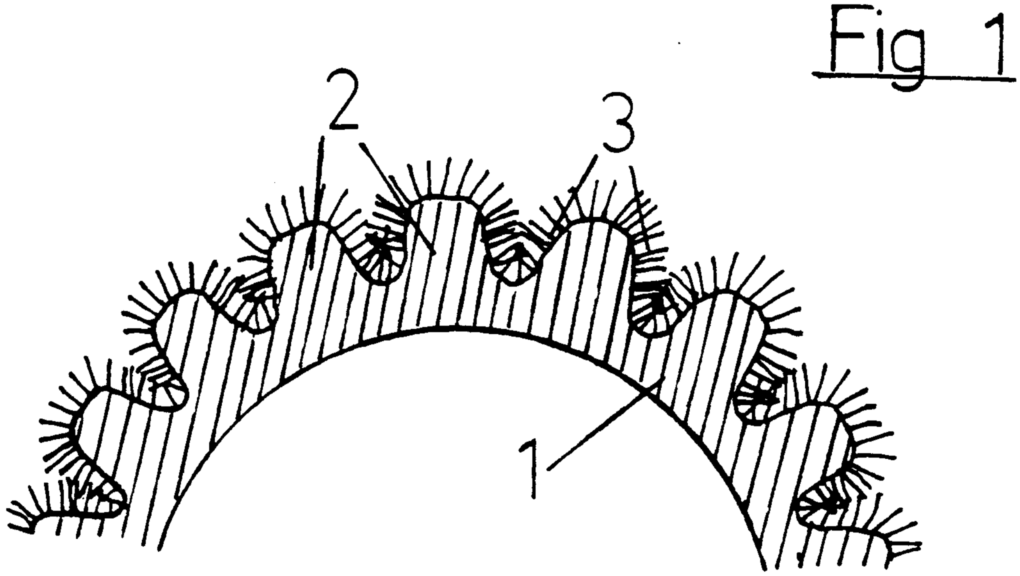
FIG. 1, in radial section, shows a portion of a tube according to the present invention and FIG. 2, in perspective, illustrates a tube according to the present invention.

FIG. 1 illustrates, in an enlarged scale, a section of a tube according to the invention. The tube comprises a body 1, having protruding longitudinal ridges 2. On these ridges 2, fibers 3, have been applied through electrostatic flocking. This flocking process is well known in the art and shall not be described in detail here.

For example, the flocking process comprises the steps of first applying adhesive onto a surface and then placing electrostatically charged fibers onto the surface. The surface is subsequently electrostatically charged and, thus, attracts the fibers. After the drying or hardening of the adhesive, the fibers which are not attached to the surface are cleaned off of the surface.

The fibers that are preferably employed in the present invention are nylon fibers which have a length of one millimeter or greater. Shorter fibers may also be employed. As an example of a suitable adhesive, polyurethane is preferably employed, but other glues and adhesives which are known in the art may also be used.

As illustrated within each of the figures, the whole surface can be covered with flocked fiber, for example, fibers can be present on the top of the ridges, on the sides of the ridges, and down at the bottom of the grooves. In this embodiment, the present invention surfaces meets the desired objectives, namely that the hand perspiration can evaporate, a desired temperature for the handle can be maintained and vibrations of the handle can be damped.

Because the handle according to FIG. 1 has been flocked while in a stretched position, the fibers on the ridges will penetrate into each other during heat contraction. This will result in a firmer contact of the ridges due to the Burdock effect between them.

The fibers located in the bottom of the grooves are not as useful as those on the sides and the tops of the ridges. Accordingly, in another embodiment, it is possible to avoid flocking the bottom of the ridges. This can be obtained by applying adhesives only to the tops and the sides of the ridges by means known in the art. For example, by brushing.

Figure 2:
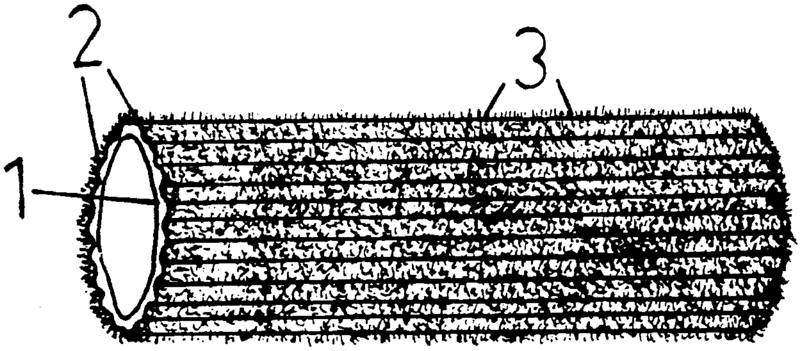

FIG. 2 illustrates a heat contractible tube according to the present invention. This embodiment illustrates a body 1 having longitudinal ridges 2, and fiber 3, applied to each surface of the ridge.

Although the invention is being simplified by means of contractible tube, it is evident that even other types of basic materials can be used. For example, one can flock a cap shaped article and thereafter place this cap over a corresponding carrier.

When the cover according to the present invention is to be applied on, for example, a handle of a tool that has been prepared as described above, it is drawn over the handle and then heated to a temperature of about 100° C. During this heating step, the tube contracts and adapts to the shape of the handle. Because the contraction is relatively large, for example, 40-50%, one will get a very firm grip of the cover onto the handle. When the cover becomes worn, it is easily replaced with a new cover by simply cutting away the old one and replacing with a new one in the above-described manner.

The advantage of using the grooved surface in the cover of the present invention is that the flocked fiber will not fold during the contraction and thus, the ventilation of hand perspiration is facilitated even when the outer flock may be worn away. As a matter of fact, it is not preferred to employ a substrate having an even surface because the flock will be worn away more quickly.

While the invention has been described in terms of various preferred embodiments, the skilled artisan will appreciate the various modifications, substitutes, omissions, and changes that ma be made without departing from the spirit thereof. Accordingly, it is intended that the scope of the present invention be limited solely by the scope of the following claims, including equivalents thereof.

I claim:

1. A cover which is capable of being employed on handles, consisting essentially of a material which is shaped so as to suit the shape of a handle and which has the ability to shrink when heated, wherein the cover has an outer surface and a plurality of longitudinal ridges defined on substantially the entirety of the outer surface and further having flocked fibers electrostatically deposited on the outer surface.

2. A cover according to claim 1, wherein the flocked fibers are applied to the tops and sides of the ridges.

3. A cover according to claim 2 wherein the material comprises a heat-contractible plastic.

4. A handle for tools, and sports articles, comprising a handle equipped with a cover according to claim 2.

5. A handle according to claim 4, wherein the cover has been heated after its application on the handle and thereby adapted its shape to the shape of the handle.

6. A cover according to claim 1 wherein the material comprises a heat-contractible plastic.

7. A cover according to claim 6 wherein the heat-contractible plastic comprises PVC plastic.

8. A handle for tools, and sports articles, comprising a handle equipped with a cover according to claim 1.

9. A handle according to claim 8, wherein the cover has been heated after its application on the handle and thereby adapted its shape to the shape of the handle.

10. A cover according to claim 1 wherein the plurality of longitudinal ridges are substantially parallel to each other.

* * * * *